Jan. 11, 1966   S. L. RUSKIN   3,228,868
PROCESS FOR THE CONVERSION OF HYDROGEN
Filed May 28, 1958
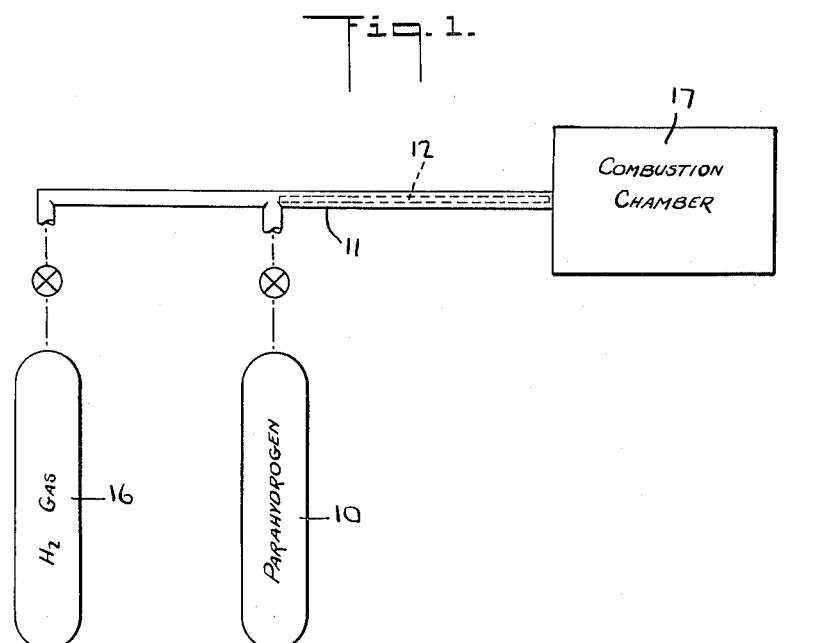
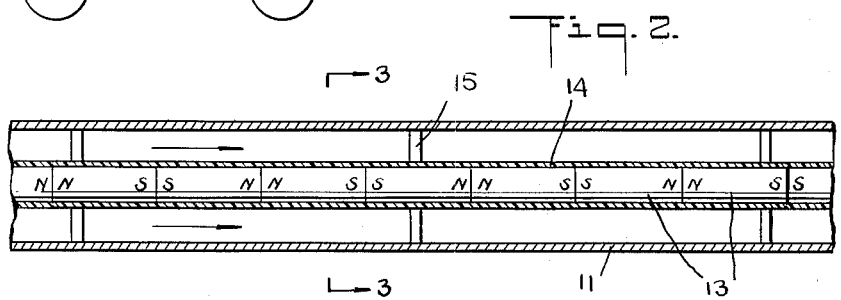
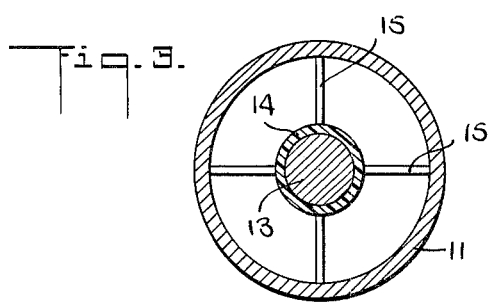
INVENTOR.
SIMON L. RUSKIN
BY
Kenyon & Kenyon
ATTORNEYS

United States Patent Office 3,228,868
Patented Jan. 11, 1966

3,228,868
PROCESS FOR THE CONVERSION OF HYDROGEN
Simon L. Ruskin, New York, N.Y.; Dan Ruskin, Milton Reder, and Carol Fahri, executors of said Simon L. Ruskin, deceased
Filed May 28, 1958, Ser. No. 738,573
2 Claims. (Cl. 204—309)

My invention relates to missile fuels, more particularly to hydrogen employed as a propellant. While hydrogen has been recognized as a near ideal propellant, it has many drawbacks, particularly the hazards of premature explosion in handling and in discharge. To overcome these dangers, the unstable orthohydrogen is catalytically converted to the more stable parahydrogen. However, parahydrogen shows a surprisingly low rate of evaporation as well as a lowered reactivity, making it much less desirable for a missile fuel. For a missile fuel it is desirable to have the hydrogen in the atomic rather than in the molecular state, particularly not in the parahydrogen state. It is important therefore to resolve this dilemma if a safe and useful missile fuel is to be secured.

I have found that the conversion of parahydrogen to orthohydrogen can be rapidly accomplished in the missile itself during the act of discharge so that the combined benefits of safe handling and high thrust capacity is retained. While the conversion of parahydrogen normally begins at 500° C. and its rate increases rapidly as the temperature is raised, this conversion does not occur rapidly enough at the moment of firing with great loss of initial thrust. While various chemical catalysts have been tried, it has been found that the rate of catalytic conversion is much too slow for a missile fuel. It is thus of great importance to be able to rapidly convert parahydrogen to orthohydrogen. The reaction is an exchange type proceeding as follows:

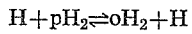

$$H + pH_2 \rightleftharpoons oH_2 + H$$

in which a free hydrogen atom enters a para molecule leading to the production of an ortho molecule and the liberation of a second free hydrogen atom.

Thus it is essential to convert an equilibrium mixture to a non-equilibrium mixture since in non-equilibrium mixtures of hydrogen (or deuterium) the concentration of hydrogen atoms (or deuterium atoms) is higher than in the equilibrium mixture. To secure this conversion, it is necessary to change the energy of interaction between nuclear spins. The molecules of the two gases, para and ortho hydrogen differ in the relative orientation of the nuclear spins of the two protons. In the para molecules the spins of the protons are anti parallel; in the ortho molecules they are parallel. The para molecules occupy the even rotational levels, the ortho molecules the odd rotational levels. Under ordinary circumstances, no transition or conversion occurs from the para state to the ortho state or vice versa. Above about 250° K. the ratio of para to ortho molecules at equilibrium is independent of temperature and is 1:3. In the case of heavy hydrogen, there is also para and ortho modification due to the different value of the nuclear spin of the deuterium nucleus, the para ortho ratio is however 1:2.

When a hydrogen molecule collides with a para magnetic molecule there is a certain probability that a para ortho transition takes place. Parahydrogen with its opposed nuclear and electron spins is diamagnetic whereas orthohydrogen in which the electron spins are opposed has nuclear spins which have the same relation for both atoms and is paramagnetic.

In the drawings:
FIG. 1 is a schematic diagram of one embodiment of the invention;
FIG. 2 is a fragmentary elevation of the fuel line; and FIG. 3 is a section taken along lines 3—3 of FIG. 2.

To practice my invention of rapidly converting parahydrogen to orthohydrogen, I induce the magnetic effects of the outer electronic shells during collision processes and by the magnetic fields arising from the rotation of molecules. To secure this action, referring to FIGS. 1 and 2, I allow the parahydrogen leaving the liquid parahydrogen cylinder 10 to pass under high pressure and speed through a pipe 11 having in its center, as a rod 12, a series of alnico permanent magnets 13 in continuous opposition so that a series of magnetic fields are created as follows:

NSSNNS

Thus the rapidly travelling molecules of parahydrogen are both repelled vertically by the diamagnetic field and collide with molecules of paramagnetic metals at the poles. The magnets 13 are maintained in their position by, for example, a plastic tube 14 which is centrally positioned within the fuel line 11 by transverse radial spokes or supports 15 (see also FIG. 3) located at axially spaced intervals along the fuel line 11. The total effect of the paramagnetic collisions is the rapid conversion of parahydrogen to orthohydrogen and a simultaneous conversion from the symmetrical to the highly reactive antisymmetrical molecular state. The rate of evaporation of the liquid hydrogen is greately enhanced and the thrust value of the hydrogen fuel greatly enhanced. To further increase the rate of conversion, a small amount of hydrogen gas from an auxiliary supply supply tank 16 is allowed to mix with the parahydrogen. Simultaneously, the hydrogen in this state has much greater catalytic value in chemical reactions and can also be more widely employed with various other components of missile fuels.

While I have described my invention for the improvement of missile fuels, I may also use my activated hydrogen for various catalytic purposes where hydrogen is employed for chemical catalysis, such as in petroleum refining, metallurgical reaction and hydrogenation reactions broadly such as hydrogenation of coal, fats, polymerization of plastics and elastomers, hydride formation and the like.

*Example 1*

In a rocket missile, the feed line 11 connecting the liquid parahydrogen tank 10 to the combustion chamber 17 is constructed so that permanent alnico magnets 13 each of which is in length 3 times its diameter. The diameter of the fuel line 11 is 3 times that of the diameter of the alnico magnets 13. The alnico magnets 13 are mounted in serial opposition for the whole length of the fuel pipe 11. On introducing the parahydrogen into the fuel line 11 a simultaneous onflow of hydrogen gas is mixed with the liquid parahydrogen.

What I claim is:
1. In an apparatus for supplying hydrogen from a liquefied reservoir source wherein it resides in a para state to an expansion and combustion chamber wherein it exists in an enriched ortho state concentration, a para to ortho converting supply line interconnecting said reservoir and said chamber, said supply line being constricted so as to cause a relatively high liquid velocity flow therethrough, and having an internally mounted series of permanent magnets so as to define an annular fluid passageway with said supply line inner wall, said permanent magnets being serially arranged in continuous like-pole to like-pole opposition.

2. The apparatus according to claim 1, wherein said magnets are alnico and each has a length approximately three times its mean diameter, and wherein the inside diameter of the supply line is approximately three times the mean diameter of the magnets.

(References on following page)

References Cited by the Examiner

UNITED STATES PATENTS

| | | | |
|---|---|---|---|
| 1,546,632 | 7/1925 | Dow et al. | 183—7.7 X |
| 1,553,737 | 9/1925 | Allingham | 183—7 |
| 2,505,798 | 5/1950 | Skinner | 102—49 |
| 2,547,936 | 4/1951 | Grow | 102—49 |
| 2,583,522 | 1/1952 | Winslow et al. | 210—223 |
| 2,652,925 | 9/1953 | Vermeiren | 210—222 |
| 2,825,464 | 3/1958 | Mack | 210—222 |

OTHER REFERENCES

Catalysis, vol. III, edited by Paul H. Emmett 1955, Reinhold Pub. Co., N.Y., pages 2–14.

Chemical Abstracts 51 (1957), abstract 4116i in column 4116, 4117.

Chemical Abstracts 48 (1954), abstract 4298h in column 4298, 4299.

Los Alamos Scientific Laboratory, LA2086, Nov. 5, 1957, page 3.

Philosophic Magazine (7), 1929, pp. 457–461.

The Spectrum of Atomic Hydrogen, by G. W. Series, Oxford Univ. Press, 1957, pp. 38, 39.

Waters: Chemistry of Free Radicals (1946), pages 31–34.

JOHN H. MACK, *Primary Examiner.*

ROGER L. CAMPBELL, WILLIAM WILES, JOSEPH REBOLD, JOHN R. SPECK, *Examiners.*

R. EPSTEIN, H. WILLIAMS, *Assistant Examiners.*